Dec. 28, 1948.  L. C. GOODALE  2,457,144
METHOD OF SEALING METAL TO GLASS
Filed June 29, 1942
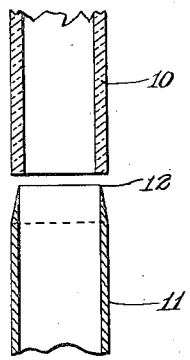
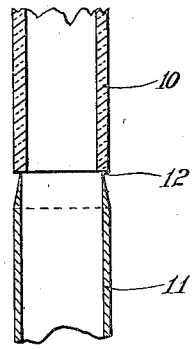
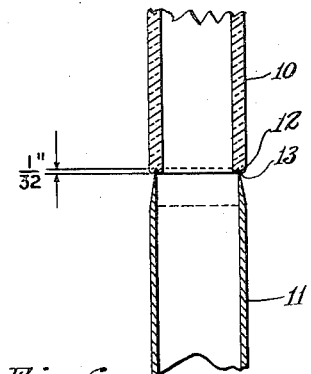
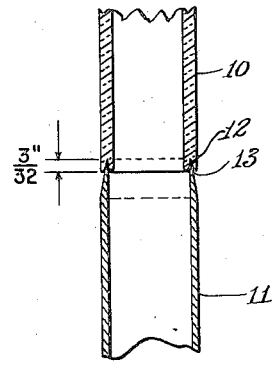
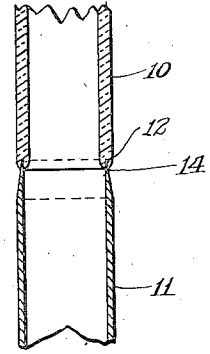
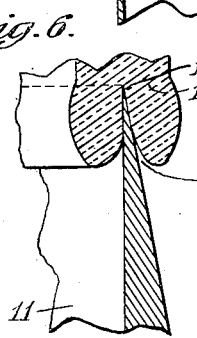
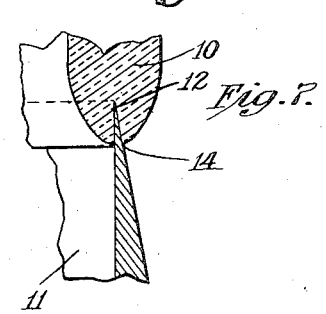
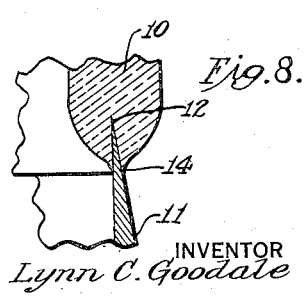
INVENTOR
Lynn C. Goodale
BY
ATTORNEY Patented Dec. 28, 1948

2,457,144

UNITED STATES PATENT OFFICE 2,457,144

METHOD OF SEALING METAL TO GLASS

Lynn C. Goodale, Newark, N. J., assignor to Federal Telephone and Radio Corporation, a corporation of Delaware Application June 29, 1942, Serial No. 448,936

5 Claims. (Cl. 49—81)

This invention relates to a method of sealing metal to glass, and more particularly to the formation of a seal between copper tubing and glass tubing. While the method is especially adapted for use in the manufacture of vacuum and gaseous tubes, it is also obviously of more general application.

An object of this invention is to reduce the time needed for sealing copper and glass tubing together.

Another object of this invention is to provide a method of producing a glass to metal seal which shall be stronger and more impervious to the passage of gasses therethrough, than seals heretofore produced.

Still another object of this invention is to provide a method of sealing glass and copper tubing without the necessity of the feeding operation heretofore used.

In the art of sealing glass to copper, there has hitherto been encountered the difficulty that the surface tension of the semi-molten glass has caused the production of an invert meniscus when the copper has been pressed into it. This phenomenon is quite similar to that encountered with glass placed in contact with a fluid metal, such as mercury. A further object of this invention is to obviate the formation of such invert meniscus in the final product resulting from my new method.

Additional objects and advantages of the present invention will be apparent from a study of the following description of a preferred method, illustrated in the accompanying drawings, wherein:

Fig. 1 shows the end portions of pieces of glass and copper tubing which are to be joined;

Fig. 2 shows the first step of the joining operation, where the members are placed in contact with one another.

Fig. 3 shows the next step in the making of the seal when the copper tubing has just penetrated the glass;

Fig. 4 illustrates the glass and copper tubing when the latter has penetrated the former a substantial amount;

Fig. 5 illustrates the final seal formed in accordance with the present invention;

Fig. 6 is an enlarged view of Fig. 4 showing the relationship between the glass and copper tubing at this stage of the operation;

Fig. 7 is an enlarged view illustrating the formation of a positive meniscus, as shown in Fig. 5; and Fig. 8 is another enlarged view illustrating a modified form of final seal.

In Fig. 1 there is shown a section of glass tubing 10 and a section of copper tubing 11 to be connected thereto. The extremity of the copper tubing has been formed with a knife edge, as indicated at 12. The relative sizes of the two pieces of tubing are preferably chosen such that the sharp edge of the copper tubing can be placed so that it will make circumferential contact with the glass tubing approximately midway between the inner and outer surfaces thereof, although such centering is not absolutely essential. In Fig. 2, the copper tubing is shown placed in actual contact with the glass tubing. This actual contact of the two elements is preferably made while both these elements are cold.

It has been found that if the tubings are placed in contact with one another before the fires are applied, a very good seal can be obtained. The glass tubing appears to partially support and protect the delicate knife edge of the copper tubing, and prevent it from becoming distorted. If the tubings are not placed in contact, the knife edge should be somewhat removed from the direct heat from the fires. As the two tubings are then revolved in a glass lathe or other suitable fixture (not shown), the welding fires are played on the end of the glass tubing. When the glass tubing begins to soften a slight pressure is applied so as to force the two tubings together. This initial stage is illustrated in Fig. 3, showing the copper tubing to have entered the glass by approximately $\frac{1}{32}$ of an inch, and it will be noted at 13 that an invert meniscus has commenced to form. When the tubing has entered the glass there is no tendency for the knife edge of the copper tubing to distort from its original circular shape. With the continued application of heat and pressure, the copper tubing continues to force its way into the glass tubing, and this pressure is continued until the required area of contact between the copper and glass seal is obtained. As illustrated in Fig. 4, the necessary penetration may be about $\frac{3}{32}$ of an inch, and also, at this point, the invert meniscus 13 is seen to have become very pronounced (Fig. 6).

Before the copper tubing has an opportunity to embed itself into the glass, a film of copper-oxide is formed. This results in producing a very satisfactory glass seal, but care must be taken that the oxide is not heated to the fusing point before the seal is made.

In order to obviate the invert meniscus formed by penetration of the copper tubing into the glass tubing, the copper tubing may then be slightly withdrawn, to form the more desirable positive meniscus illustrated in Figs. 5 and 7. Although, in this case, the total penetration of the copper tubing into the glass has been somewhat reduced, the joint between the copper and glass will be stronger, since the positive meniscus is less liable to breakage.

In some cases it is deemed desirable to withdraw the copper tubing still further, to form the type of seal illustrated in Fig. 8.

It is to be understood that the tubing employed in carrying out this invention is to be prepared for the sealing by annealing processes well-known in the art, and that further annealing after the structure has assumed the shape shown in Fig. 5 (or Fig. 8) is usually found in practice to be highly desirable.

Although my method has been described specifically in connection with the formation of a copper-glass tubing seal, it is to be understood that it is applicable to other metal to glass seals. Additionally, the dimensions which have been set forth, such as the depth of penetration of the copper tubing into the glass tubing, have been given merely by way of example, and will vary in accordance with other factors, such, for example, as the diameters of the tubings to be sealed together. Accordingly, while I have illustrated one preferred embodiment of my invention, it is not intended to limit this invention thereto, except as may be required by the claims which follow.

I claim:

1. The method of sealing glass to metal which includes the steps of placing the metal and glass in contact while at normal temperature, raising the temperature of the glass sufficiently to soften it, forcing the metal into the softened glass for a predetermined distance and retracting the metal for a lesser distance, forming a positive meniscus at the surface of contact.

2. In the process of sealing together a copper tube and a glass tube of commensurate diameter, the steps which include placing the edges of the respective tubes in contact, forcing the tubes toward one another, heating the tubes until the glass tube is softened and the edge of the copper tube enters the wall of the glass tube for a predetermined distance, and pulling the tubes apart for a lesser distance so as to form a positive meniscus at the surface of contact of the tubes thereof.

3. The method of uniting a body of thermoplastic material and a body of metal which includes the steps of placing said two bodies in contact and under pressure tending to force them together, heating said bodies until said thermoplastic body softens and said metal body penetrates therein for a predetermined distance, and pulling apart said bodies for a shorter distance until a positive meniscus is formed at the surface of contact between said bodies.

4. The method of sealing a metal part having substantially a knife edge to a glass part which includes the steps of applying heat directly to the glass part until said glass part becomes softened while maintaining said metal part below the temperature at which deformation of the knife edge occurs, forcing said knife edge into the softened glass and thereby forming an invert meniscus at the surface of contact between the metal and the glass, and partially retracting said metal part and thereby changing the invert meniscus to a positive meniscus.

5. The method of sealing a metal part having substantially a knife edge to a glass part comprising applying heat to the glass part until said glass part softens forcing said knife edge into the softened glass, and finally partially retracting said metal part before said glass part hardens.

LYNN C. GOODALE.

REFERENCES CITED

The following references are of record in the file of this patent:

UNITED STATES PATENTS

| Number | Name | Date |
|---|---|---|
| 872,530 | Meeker | Dec. 3, 1907 |
| 907,489 | Genese | Dec. 22, 1908 |
| 1,627,780 | Jonas | May 10, 1927 |
| 2,010,145 | Eitel | Aug. 6, 1935 |
| 2,062,836 | Scott | Dec. 1, 1936 |
| 2,075,057 | Richardson | Mar. 30, 1937 |
| 2,125,315 | Ronci | Aug. 2, 1938 |
| 2,203,917 | Mallory | June 11, 1940 |
| 2,288,537 | Mallory | June 30, 1942 |